(12) United States Patent
Trinchieri

(10) Patent No.: US 11,215,203 B2
(45) Date of Patent: Jan. 4, 2022

(54) LOGIC VALVE FOR THE MANAGEMENT OF A HYDRAULIC ACTUATOR AND CORRESPONDING HYDRAULIC CIRCUIT

(71) Applicant: DANA MOTION SYSTEMS ITALIA S.R.L., Reggio Emilia (IT)

(72) Inventor: Piergiorgio Trinchieri, Reggio Emilia (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 0 days.

(21) Appl. No.: 16/863,842

(22) Filed: Apr. 30, 2020

(65) Prior Publication Data

US 2020/0362886 A1 Nov. 19, 2020

(30) Foreign Application Priority Data

May 3, 2019 (IT) .......................... 102019000006501

(51) Int. Cl.
*F15B 13/04* (2006.01)
*F01C 20/24* (2006.01)

(52) U.S. Cl.
CPC .......... *F15B 13/0402* (2013.01); *F01C 20/24* (2013.01)

(58) Field of Classification Search
CPC ..... E02F 9/2296; E02F 9/2285; E02F 9/2235; E02F 9/2267; F15B 2211/6652; F15B 13/01; F16K 21/044
USPC .................................................. 91/421, 420
See application file for complete search history.

(56) References Cited

U.S. PATENT DOCUMENTS

| 3,626,968 A * | 12/1971 | Hancock ................. F16D 25/14 |
| | | 137/115.26 |
| 7,296,669 B2 * | 11/2007 | Quehenberger ........ F16D 25/14 |
| | | 192/85.63 |
| 2007/0198098 A1 * | 8/2007 | Roston ..................... A61F 2/70 |
| | | 623/26 |

FOREIGN PATENT DOCUMENTS

| EP | 2371642 A | 10/2011 |
| IT | MO20100302 A1 | 4/2012 |

* cited by examiner

*Primary Examiner* — Abiy Teka
*Assistant Examiner* — Daniel S Collins
(74) *Attorney, Agent, or Firm* — McCoy Russell LLP

(57) ABSTRACT

A logic valve for management of a hydraulic actuator comprising: a valve body with a hollow seat which extends along a work direction and communicates with a first port adapted for receiving a pressurized working fluid, a second port adapted for fluidly coupling with an operating chamber of the hydraulic actuator, and a third port adapted for discharging the working fluid; a slider within the hollow seat movable along the work direction; and a spring between the valve body and the slider and oriented to act on the slider along the work direction in the direction away from said third port, wherein the slider is movable between a first operating configuration fluidly coupling the second and third ports and excluding fluid communication between them and the first port, and a second operating configuration fluidly coupling the first and second ports and excluding fluid communication between them and the third port.

19 Claims, 10 Drawing Sheets

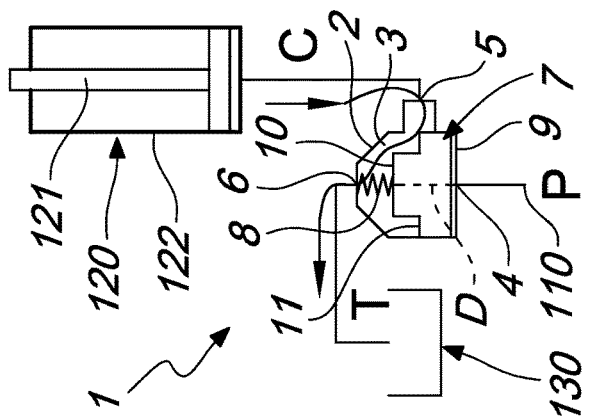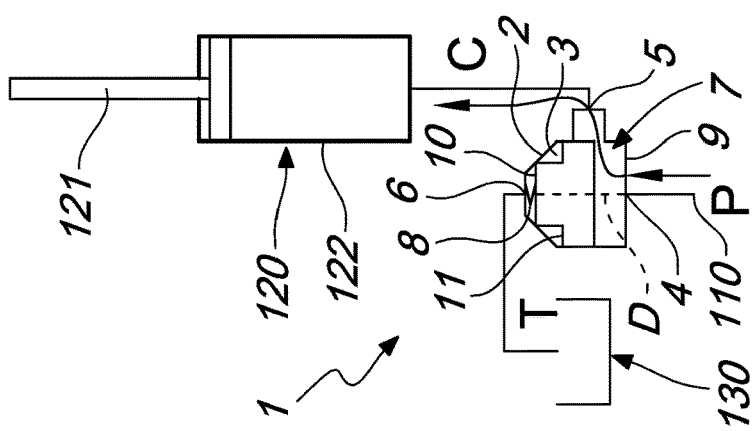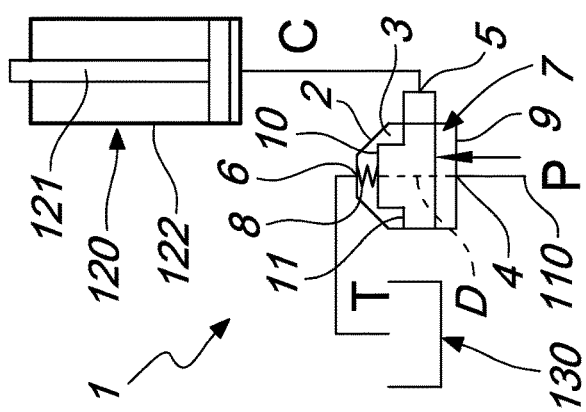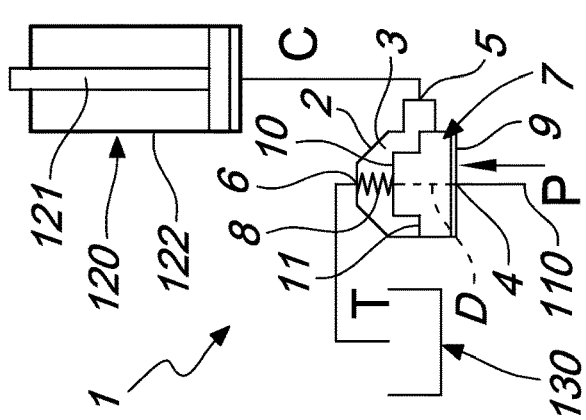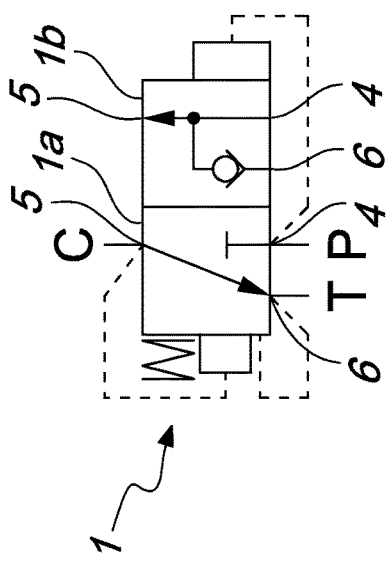

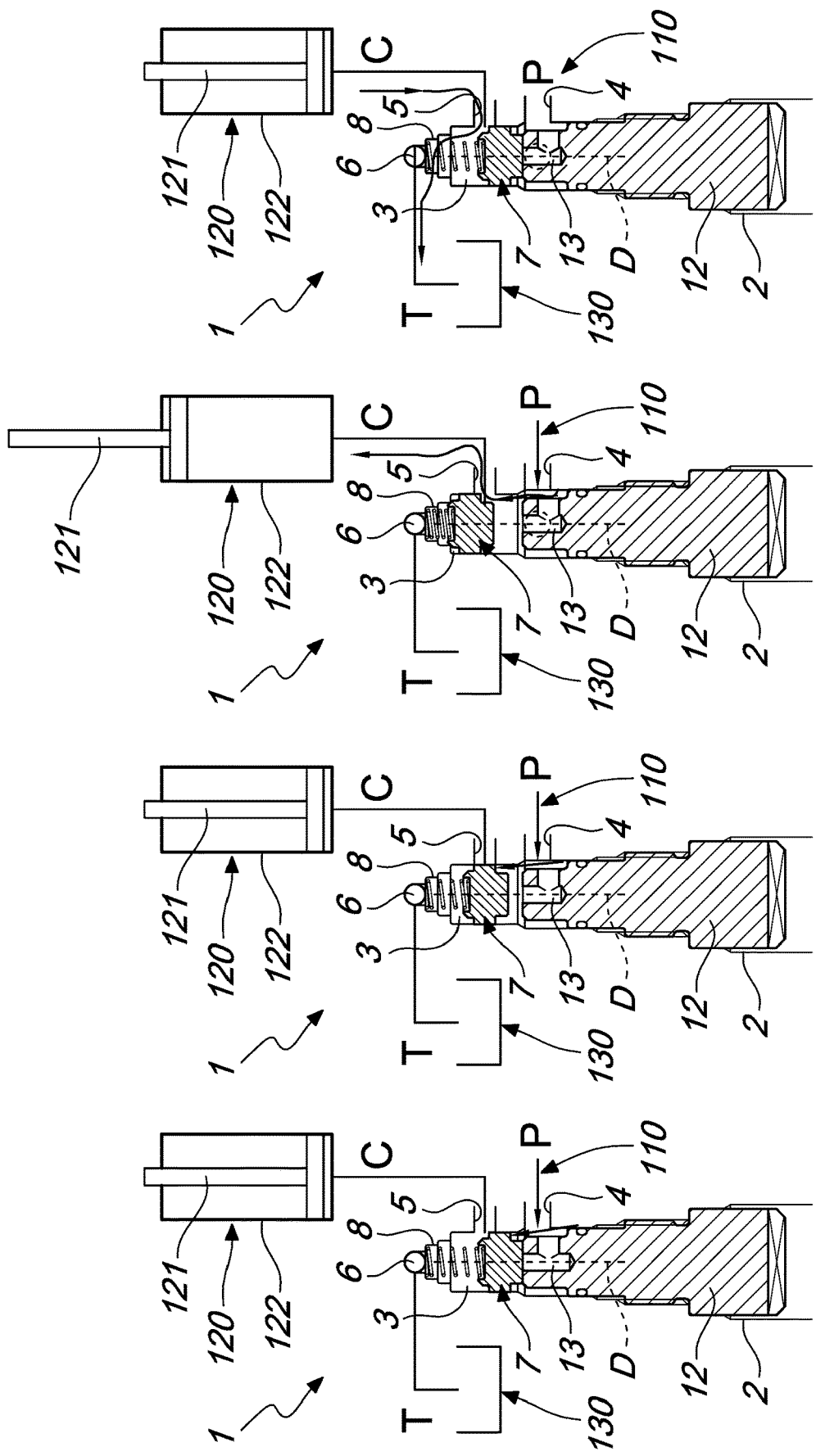

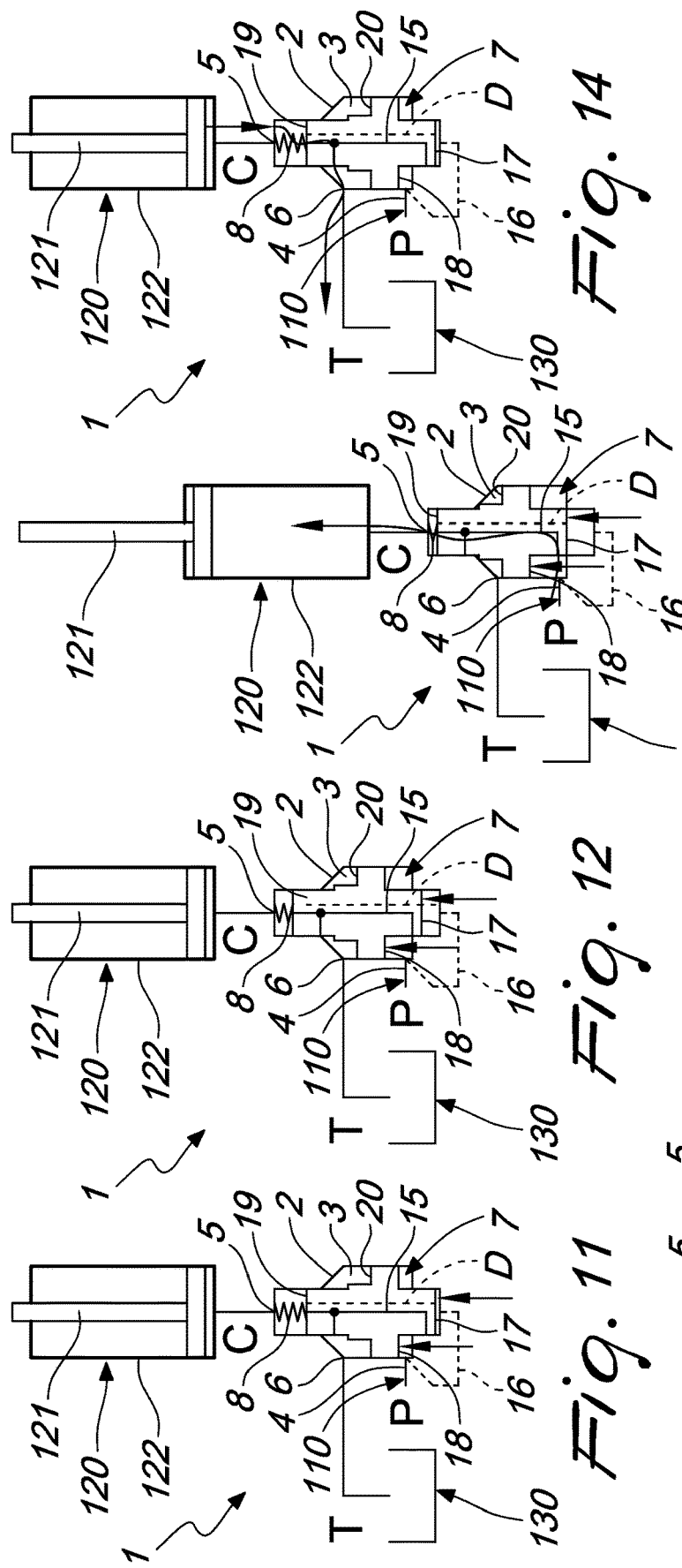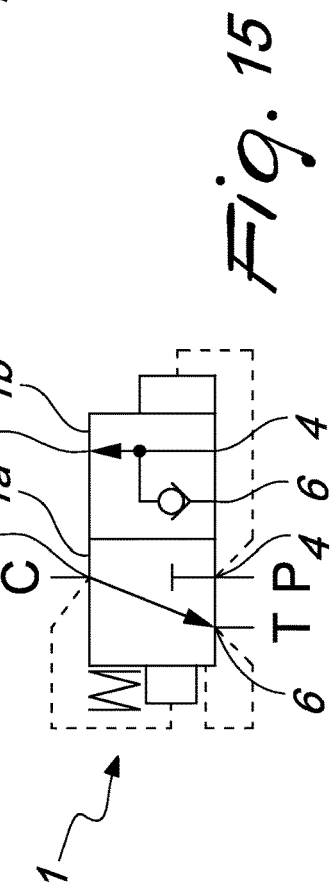

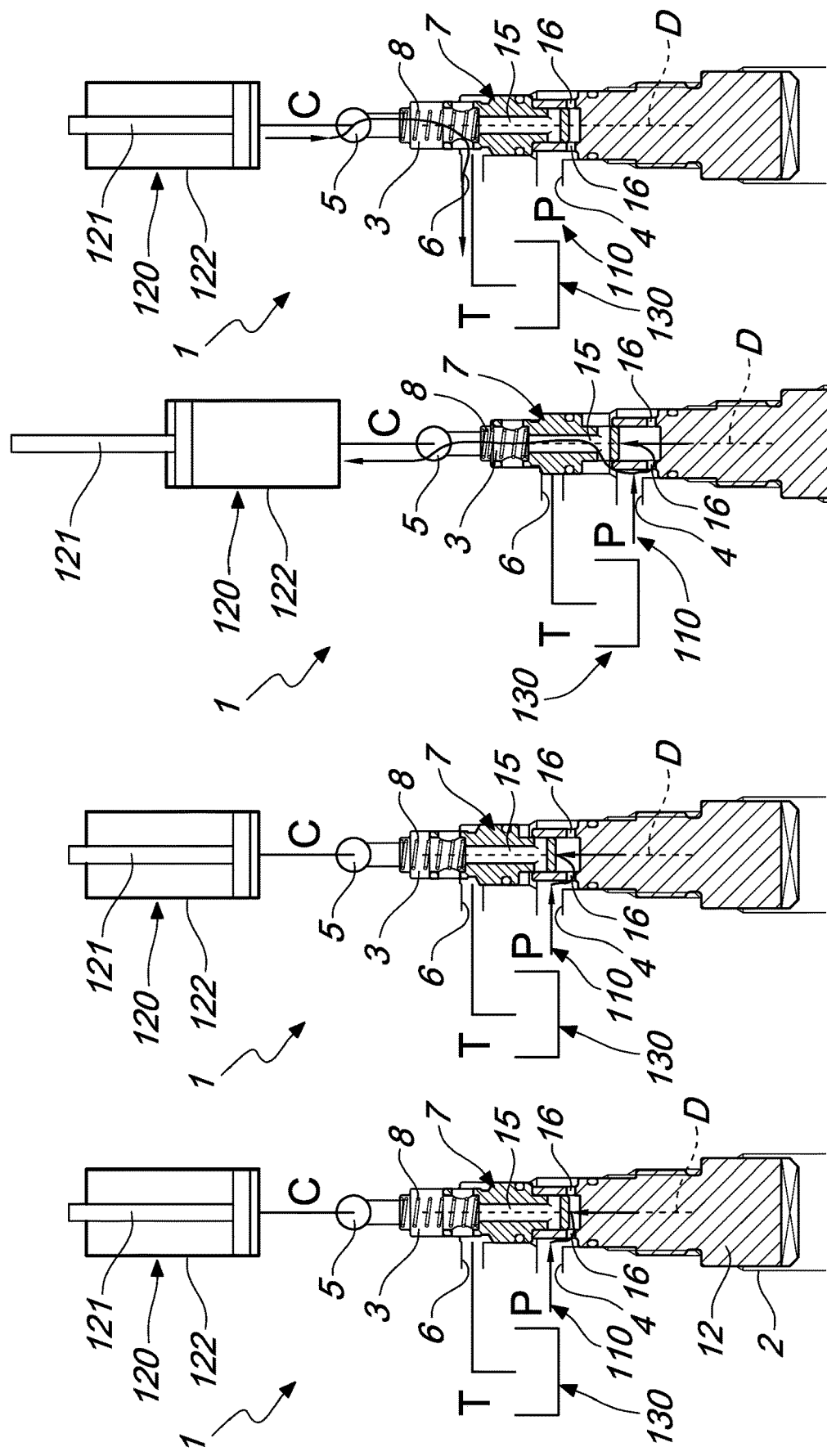

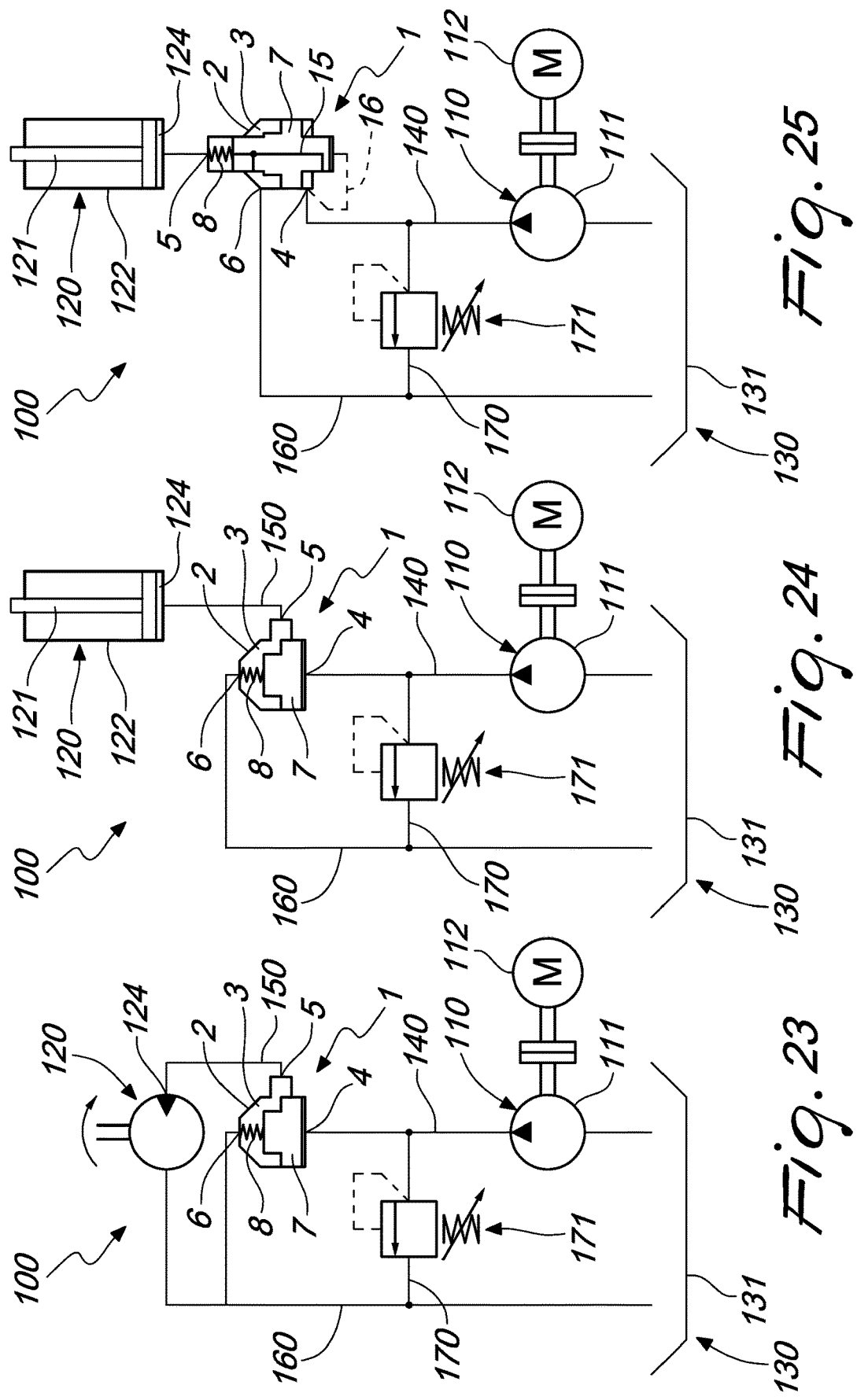

LOGIC VALVE FOR THE MANAGEMENT OF A HYDRAULIC ACTUATOR AND CORRESPONDING HYDRAULIC CIRCUIT

CROSS-REFERENCE TO RELATED APPLICATIONS

The present application claims priority to Italian Patent Application No. 102019000006501, entitled "VALVOLA LOGICA PER LA GESTIONE DI UN ATTUATORE IDRAULICO E RELATIVO CIRCUITO IDRAULICO", and filed on May 3, 2019. The entire contents of the above-listed application is hereby incorporated by reference for all purposes.

TECHNICAL FIELD

The present invention relates to a logic valve for the management of a hydraulic actuator and a corresponding hydraulic circuit.

BACKGROUND AND SUMMARY

Hydraulic actuators are known, i.e., components capable of transforming hydraulic energy of a working fluid flowing through them into mechanical energy delivered to a follower member operated in rotary or linear motion.

For example, hydraulic actuators of the hydraulic cylinder type are known, in which the hydraulic energy of the working fluid operates the corresponding piston with linear motion, or of a hydraulic motor type in which the hydraulic energy of the working fluid operates the drive shaft with rotary motion.

These actuators can be single or double acting, depending on whether the working fluid operates the linear or rotary motion of the following member in one or in both directions.

Hydraulic circuits for the management of the working fluid flowing into and out of these hydraulic actuators are known, which generally comprise a storage tank for the working fluid, a pump to supply the working fluid to the actuator operated by a corresponding motor, at least one supply line for the working fluid interposed between said pump and the actuator and at least one discharge line for the fluid itself interposed between the actuator and the tank, a supply line and a discharge line being provided for single acting actuators or two supply lines and two discharge lines for double acting actuators, and valve means for the flow management interposed between the supply and discharge lines.

For example, the Italian patent no. 1368548 teaches the use of valve means comprising a logic valve for the management of the working fluid flowing out of and into each chamber of a double acting hydraulic jack.

This logic valve comprises a valve body extending along a work direction and provided with a first port for connection to the supply line, with a second port for connection to a communication line with the operating chamber of the jack, and with a third port for connection to the discharge line, the first and the second ports being positioned at the mutually opposite ends of the valve body along the work direction and the third port being arranged laterally proximate to the second port.

The logic valve also comprises a logic element or slider housed inside the valve body and moving with alternating translation along the work direction, which is provided with a through duct extending along the work direction and intercepted by a one-way valve that can be opened to place the first port in communication with the second port. The logic element is provided with three active surfaces, namely a first circular surface exposed to the pressure of the working fluid flowing through the first port, a second circular surface exposed to the pressure of the working fluid flowing through the second port and a third annular surface exposed to the pressure of the working fluid passing through the second and/or the third port as a function of the operating configuration assumed by the valve, the extension of the first surface being substantially equal to the sum of the extensions of the second and third surfaces.

This logic valve of a known type, according to the pressures acting on the corresponding active surfaces, is therefore adapted to assume the following operating configurations:

in the absence of a flow of pressurized fluid through the first port (supply pump stopped or inversion of the operating direction of the jack) the return spring presses on the logic element which assumes a first longitudinal position in which it prevents fluid communication between the first and the second ports and the one-way valve remains closed, the second and the third ports being in fluid communication with each other for discharge of the corresponding chamber of the jack;

when the pump supplies pressurized working fluid along the supply line that through the first port acts on the first surface of the logic element and overcomes the force of the return spring causing its movement along the work direction. In a first transient step, the logic element moves along the work direction in a first direction until reaching a second longitudinal position in which the fluid communication between the second and the third ports is interrupted, with the one-way valve always closed. In a second operating step of the actuator, the logic element remains in the second longitudinal position and the one-way valve opens to allow the fluid communication between the first and the second ports and the filling of the chamber of the cylinder;

when delivery of the pump is interrupted, the pressurized working fluid that passes through the second port acts first only on the second surface and then also on the third surface, causing the logic element to move in a second direction, opposite to the first, until it is returned to the first longitudinal position along the work direction, opening the fluid communication between the second and the third ports for discharge of the cylinder chamber, the fluid communication with the first port being prevented by the closed one-way valve.

These logic valves of a known type are not without drawbacks, including the fact that they have a complex structure, as they must be integrated with directional valve to manage the flow of working fluid from the first to the second port, i.e., from the supply toward the jack chamber, while the return flow from the second to the third port, i.e., from the jack chamber toward the discharge, is managed by means of the movement of the logic element.

The main aim of the present invention is to eliminate the aforesaid drawbacks of the known art by devising a logic valve for the management of a hydraulic actuator which has a simplified structure relative to the known solutions and, consequently, lower manufacturing costs and greater reliability. Within this technical aim, another object of the present invention is that of being applicable to different types of hydraulic actuators, both rotary and linear, single or double acting.

A further object of the present invention is that of being employable inside conventional hydraulic actuators without requiring structural modifications thereto, or requiring only minimally invasive modifications.

One more object of the present invention is to provide a simple structure, which has a relatively easy practical implementation, is safe to use and operates efficiently, with a relatively limited cost.

This aim and these objects are all achieved by the present logic valve for the management of a hydraulic actuator according to the described embodiments.

Moreover, this aim and these objects are all achieved by the hydraulic management circuit according to the described embodiments.

BRIEF DESCRIPTION OF THE FIGURES

Further features and advantages of the present invention will be more apparent from the detailed description of some preferred, but not exclusive embodiments of a logic valve for the management of a hydraulic actuator and of a corresponding hydraulic management circuit of a hydraulic actuator, illustrated by way of non-limiting example in the accompanying drawings, wherein:

FIGS. 1-4 are schematic representations of a first embodiment of a logic valve for the management of a hydraulic actuator, according to the invention, with the corresponding connections and in different operating conditions;

FIG. 5 is an alternative schematic representation of the first embodiment of the logic valve of the preceding figures;

FIGS. 6-9 are representations corresponding to FIGS. 1-4 in which a possible construction of the first embodiment of the valve according to the invention is depicted in a sectional view;

FIGS. 11-14 are schematic representations of a second embodiment of the logic valve according to the invention, with the corresponding connections and in different operating conditions;

FIG. 15 is an alternative schematic representation of the second embodiment of the logic valve of the preceding figures;

FIGS. 16-19 are representations corresponding to FIGS. 11-14 in which a possible construction of the second embodiment of the valve according to the invention is depicted in a sectional view;

FIG. 23 is a schematic representation of a management circuit of a single acting rotary actuator that employs a logic valve according to the first embodiment of the invention;

FIG. 24 is a schematic representation of a management circuit of a single acting linear actuator that employs a logic valve according to the first embodiment of the invention;

FIG. 25 is a schematic representation of a management circuit of a single acting linear actuator that employs a logic valve according to the second embodiment of the invention;

DETAILED DESCRIPTION

Figure 10:
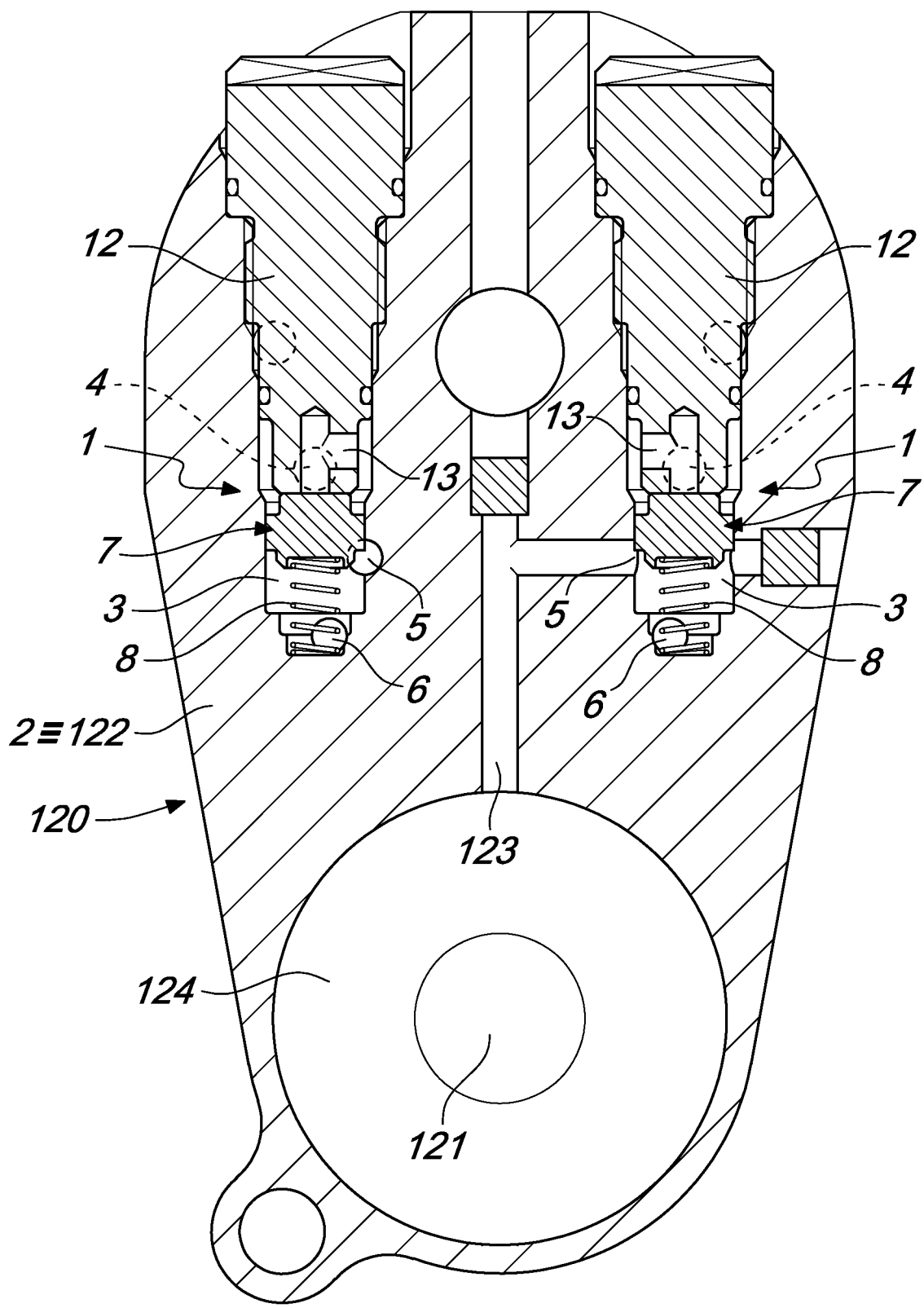
FIG. 10 is a sectional view of a double acting linear actuator which incorporates two valves according to the first embodiment of the invention.

With particular reference to these figures, the reference number 1 indicates as a whole a logic valve for the management of a single or double acting linear or rotary hydraulic actuator.

The valve 1 comprises a valve body 2 provided internally with a hollow seat 3 extending along a work direction D and communicating with a first port 4 adapted to be placed in fluid communication with means 110 for supplying a pressurized working fluid, a second port 5 adapted to be placed in fluid communication with an operating chamber 124 of a hydraulic actuator 120, a third port 6 adapted to be placed in fluid communication with means 130 for discharging the working fluid.

The working fluid employed can typically be of the hydraulic oil type. The valve 1 further comprises a slider 7 housed inside the valve body 2 and which can move with an alternating sliding motion along the work direction D through the seat 3 and elastic means 8 interposed between the valve body 2 and the slider 7 and acting thereon along the work direction D in the direction away from the third port 6.

These elastic means 8 can, for example, be composed of an elastic compression coil spring interposed between the inner surface defining the seat 3 and the slider 7.

The slider 7 can move alternately between a first operating configuration for establishing the communication of the second and third ports 5 and 6 and excluding the communication between them and the first port 4 and a second operating configuration for establishing the communication between the first and second ports 4 and 5 and excluding the communication between these and the third port 6. In the transition between the first and the second operating configurations, the slider 7 passes through a transient configuration in which the three ports 4, 5 and 6 are mutually isolated.

The slider 7 is inserted in a fluid-tight manner along the seat 3 by means of interposition of hydraulic sealing members such as rubber rings or of similar type, not described in detail as known.

In a first embodiment (FIGS. 1-10) the first and third ports 4 and 6 are in fluid communication with the seat 3 at the mutually opposite ends along the work direction D and the second port 5 is in fluid communication with said seat in a position that is intermediate between the preceding ones.

The slider 7 has a continuous external surface being adapted to not be crossed by the working fluid. Preferably, the slider 7 is made in one solid piece.

The slider 7 has a first circular active surface 9 which faces the first port 4, a third circular active surface 10 which faces the third port 6 and a second annular active surface 11, which is interposed between the preceding ones. The sum of the extensions of the second and third surfaces 11 and 10 is equal to the extension of the first surface 9.

In the first operating configuration, the second surface 11 is interposed between the first and the second port 4 and 5. In the second operating configuration, the second surface 11 is interposed between the second and the third ports 5 and 6.

In FIGS. 1-4, the valve 1 is represented schematically in different operating conditions.

In FIG. 1, when no working fluid is delivered from the supply means 110, the slider 7 is maintained in the first operating configuration by the action of the elastic means 8.

If the delivery of pressurized working fluid from the supply means 110 through the first port 4 is activated, the resulting force acting on the first surface 9 overcomes the resistance of the elastic means 8 and the slider 7 tends to move along the work direction D in the direction away from the first port 4. In FIG. 2, the valve 1 is illustrated with the slider 7 in the transient configuration in which it isolates the ports 4, 5 and 6.

Subsequently, the slider 7 continues to move along the work direction D until reaching the second operating configuration (FIG. 3) in which it opens the fluid communication from the first port 5 towards the second port 5 to supply the actuator 120 and isolate the third port 6. In this condition, the stem 121 of the actuator is lifted (relative to the figures).

When the delivery of pressurized working fluid through the first port 4 stops, the elastic means 8 act on the slider 7, returning it to the first operating configuration and the actuator 120 discharges the working fluid from the second port 5 through the third port 6 towards the discharge means 130 (FIG. 4), and the stem 121 of the actuator is lowered (relative to the figures).

FIG. 5 depicts a different schematic representation of the valve 1 according to the first embodiment which shows the two operating stages, of which a first stage 1a corresponds to the first operating configuration and a second stage 1b corresponds to the second operating configuration.

FIGS. 6-9 correspond to the operating conditions represented, respectively, in FIGS. 1-4. In FIGS. 6-9, the first embodiment of the valve 1 is represented in a possible constructive embodiment in which the valve body 2 is coupled to a cap 12 in which a duct 13 is defined for establishing communication of the first port 4 defined on said valve body with the inside of the seat 3.

Figure 21:
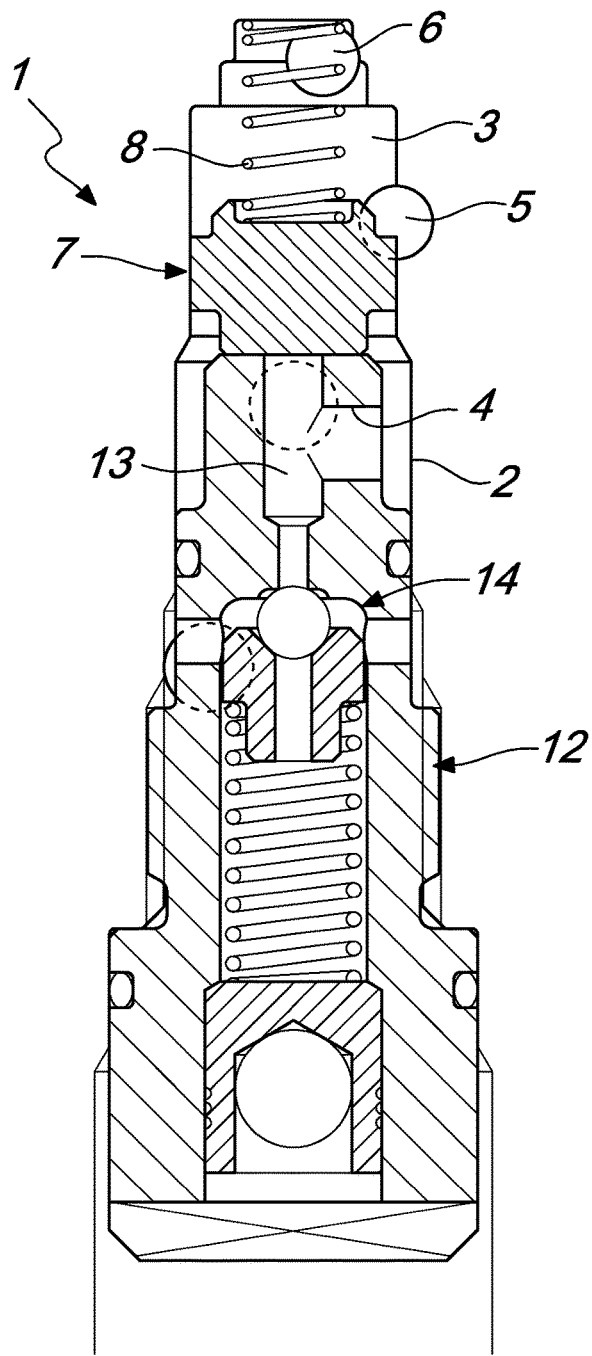
FIG. 21 is a schematic sectional view of a variant of the first embodiment of the logic valve according to the invention indicated in FIGS. 6-10, which incorporates a maximum pressure valve.

In a variant, represented in FIG. 21, the cap 12 can integrate a maximum pressure valve 14, not described in detail as of a known type, associated with the first port 4.

FIG. 10 represents a possible embodiment of a double acting linear hydraulic actuator 120 which incorporates two valves 1 according to the first embodiment inserted in respective housings defined on the casing 122 of said actuator, each having the corresponding second port 5 in fluid communication with a respective operating chamber 124 by means of ducts 123 obtained inside said casing.

In FIGS. 1-4 and 6-9, the hydraulic actuator 120 is schematically represented as a single acting linear actuator of a conventional jack type, although it could also be of double acting linear type, or of single or double acting rotary type.

In a second embodiment (FIGS. 11-20), the first port 4 is in fluid communication with the seat 3 at a first end along the work direction D, the second port 5 is in fluid communication with a second end, opposite to the first one, of the seat 3 along the work direction D, and the third port 6 is in fluid communication with the seat 3 in an intermediate position between the preceding ones. In this case, the slider 7 is provided with an internal channel 15 for establishing communication of the first and second ports 4 and 5 in the second operating configuration and of the second and third ports 5 and 6 in the first operating configuration.

More in detail, the first port 4 is directly in fluid communication with the seat 3 proximate to the first longitudinal end and at said first end by means of a branch 16.

The slider 7 comprises a first circular surface 17 and a first annular surface 18 which face the first port 4, a second circular surface 19 which faces the second port 5 and a third annular surface 20 which faces the third port 6, the first circular surface 17 and the second circular surface 19 having substantially mutually identical extensions and the first annular surface 18 and the third annular surface 20 having substantially mutually identical extensions.

More in detail, the first circular surface 17 is exposed to the pressurized working fluid passing through the branch 16 and the first annular surface 18 is exposed to the pressurized working fluid passing through the first port 4. In the first and in the second operating configuration, the first and the second annular surface 18 and 20 are interposed between the first and third ports 4 and 6.

In FIGS. 11-14, the valve 1 is represented schematically in different operating conditions.

In FIG. 11, in the absence of delivery of working fluid from the supply means 110, the slider 7 is maintained in the first operating configuration by the action of the elastic means 8.

If the delivery of pressurized working fluid from the supply means 110 through the first port 4 and the corresponding branch 16 is activated, the resulting force acting on the first circular surface 17 and on the first annular surface 18 overcomes the resistance of the elastic means 8 and the slider 7 tends to move along the work direction D in the direction away from the first port 4.

In FIG. 12, the valve 1 is illustrated with the slider 7 in the transient configuration in which it isolates the ports 4, 5 and 6.

Subsequently, the slider 7 continues to move along the work direction D until reaching the second operating configuration (FIG. 13) in which it opens the fluid communication from the first port 5 towards the second port 5 to supply the actuator 120 through the channel 15 and the second port 5 and isolates the third port 6. In this condition, the stem 121 of the actuator is lifted (relative to the figures).

When the delivery of pressurized working fluid through the first port 4 stops, the elastic means 8 act on the slider 7, returning it to the first operating configuration, and the actuator 120 discharges the working fluid from the second port 5 through the channel 15 and the third port 6 towards the discharge means 130 (FIG. 14), and the stem 121 of the actuator is lowered (relative to the figures).

FIG. 15 depicts a different schematic representation of the valve 1 according to the second embodiment which shows the two operating stages thereof, a first stage 1a corresponding to the first operating configuration and a second stage 1b corresponding to the second operating configuration.

FIGS. 16-19 correspond to the operating conditions represented, respectively, in FIGS. 11-14. In FIGS. 16-19, the first embodiment of the valve 1 is represented in a possible constructive embodiment in which the valve body 2 is coupled to a cap 12 in which the branch 16 is defined, for establishing communication of the first port 4 defined on said valve body with the longitudinal end of the seat 3.

Figure 22:
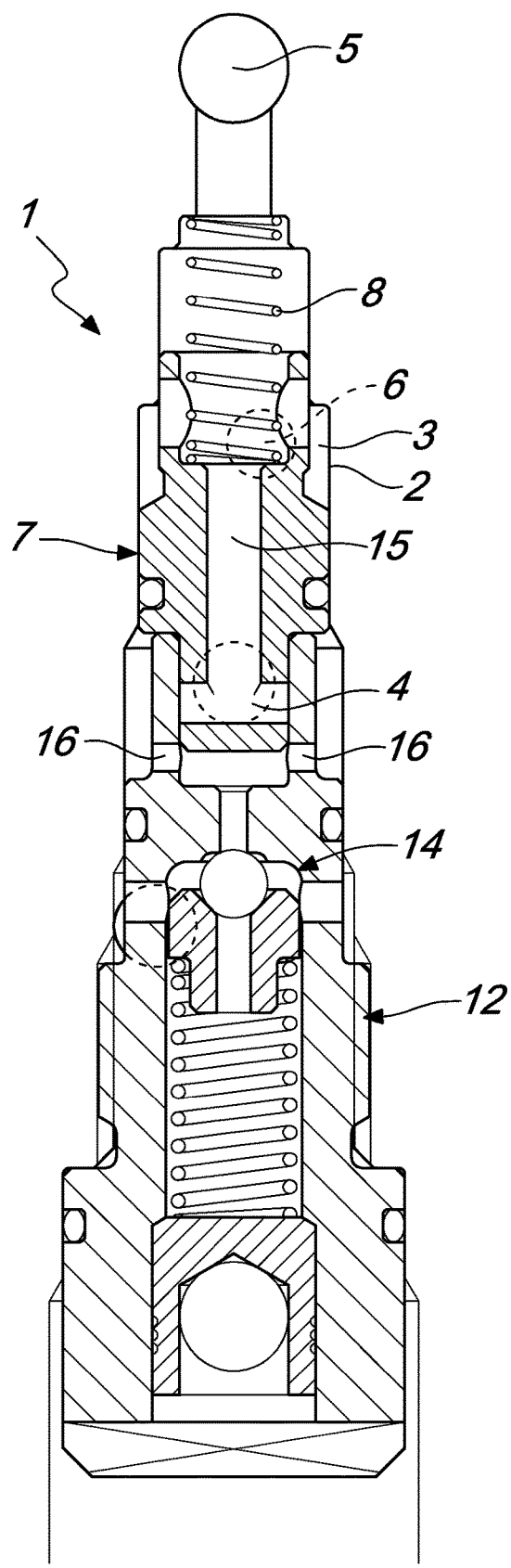
FIG. 22 is a schematic sectional view of a variant of the second embodiment of the logic valve according to the invention indicated in FIGS. 16-20, which incorporates a maximum pressure valve.

In a variant, represented in FIG. 22, the cap 12 can integrate a maximum pressure valve 14, not described in detail as of a known type, associated with the first port 4.

Figure 20:
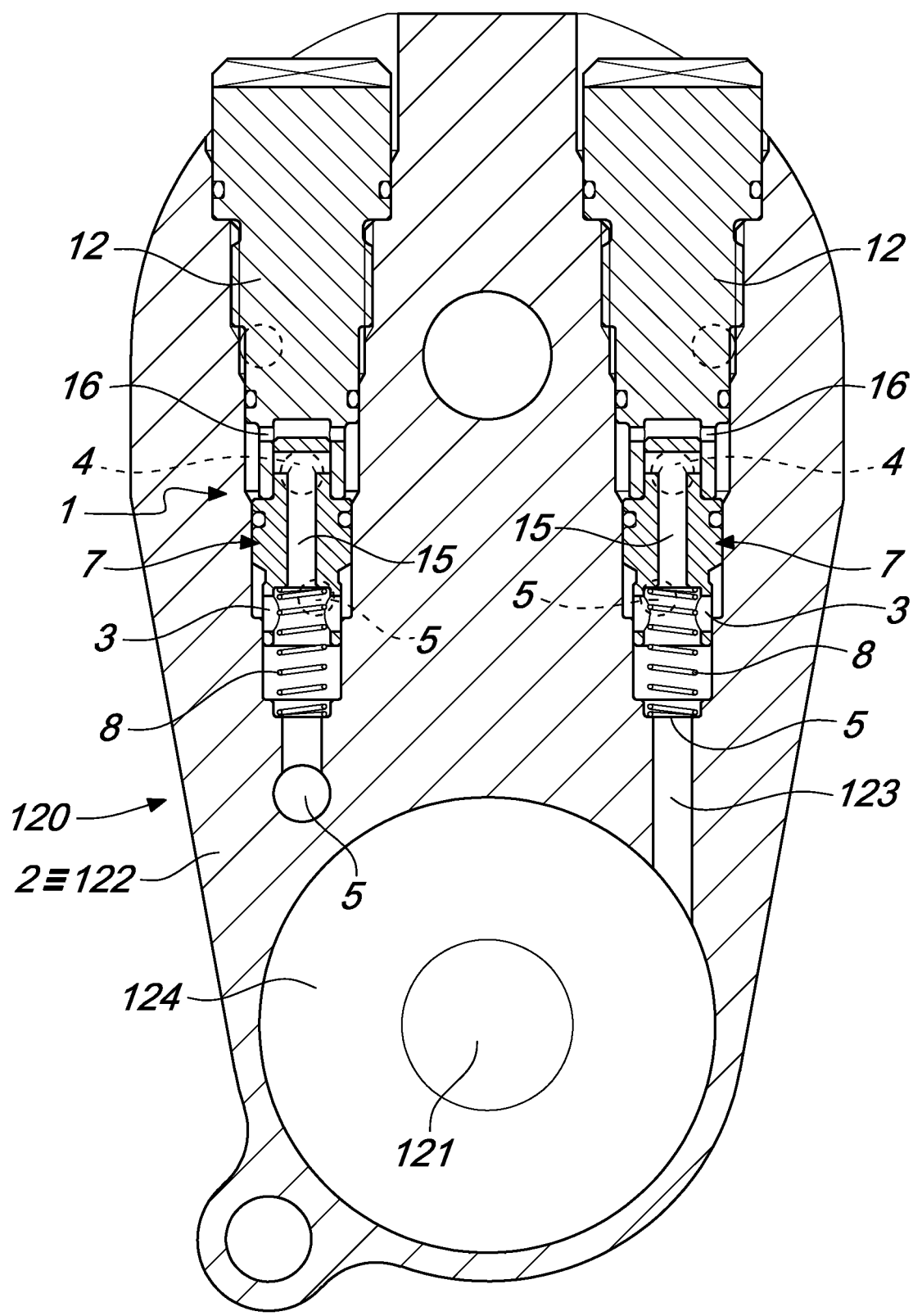
FIG. 20 is a sectional view of a double acting linear actuator which incorporates two valves according to the second embodiment of the invention.

FIG. 20 represents a possible embodiment of a double acting linear hydraulic actuator 120 which incorporates two valves 1 according to the second embodiment inserted in respective housings defined on the casing 122 of said actuator, which acts as valve body 2, each having the corresponding second port 5 in fluid communication with a respective operating chamber by means of ducts 123 obtained inside said casing.

In FIGS. 11-14 and 16-19, the hydraulic actuator 120 is schematically represented as a single acting linear actuator of the conventional jack type, although it could also be of double acting linear type, or of single or double acting rotary type.

The hydraulic management circuit 100 according to the invention comprises the hydraulic actuator 120, which has at least one operating chamber 124, the means 110 for supplying the pressurized working fluid towards said operating chamber 124, the discharge means 130 for collecting the working fluid delivered from said chamber.

The supply means 110 can typically consist of a conventional pump 111 with corresponding drive motor 112.

The discharge means 130 can be of ambient pressure or controlled pressure tank 131 type, according to the requirements of the specific application.

The circuit 100 comprises at least one valve 1 which has the first port 4 in fluid communication with a first operating line 140 for connection to the supply means 110, the second port 5 in fluid communication with a second operating line 150 for connection to the operating chamber 124 of the actuator 120, and the third port 6 in fluid communication with a third operating line 160 for connection to the discharge means 130.

In the case in which the actuator 120 is of a double acting type, two operating chambers 124 are provided. The circuit 100 is thus provided with two valves 1, each of which has the first port 4 in fluid communication with the supply means 110 through a respective first operating line 140, the second port 5 in fluid communication with a corresponding operating chamber 124 through a respective second operating line 150 and the third port 6 in fluid communication with the discharge means 130 through a respective third operating line 160.

The actuator 120 can be of linear (e.g. jack) or rotary (e.g. motor) type. For safety, a by-pass branch 170 can be provided, intercepted by a maximum pressure valve 171 interposed between the first operating line 140 and the third operating line 160.

This maximum pressure valve 171 can be integrated in the valve 1 as represented in FIGS. 21 and 22.

FIG. 23 schematically illustrates a circuit 100 of the type described above that employs a valve 1 according to the first embodiment above and in which the actuator 120 is of single acting rotary type.

FIG. 24 schematically illustrates a variant of the circuit 100 of FIG. 23 in which the actuator 120 is of single acting linear type.

FIG. 25 schematically illustrates a variant of the circuit 100 of FIG. 24 that employs a valve 1 according to the second embodiment described above.

Figure 26:
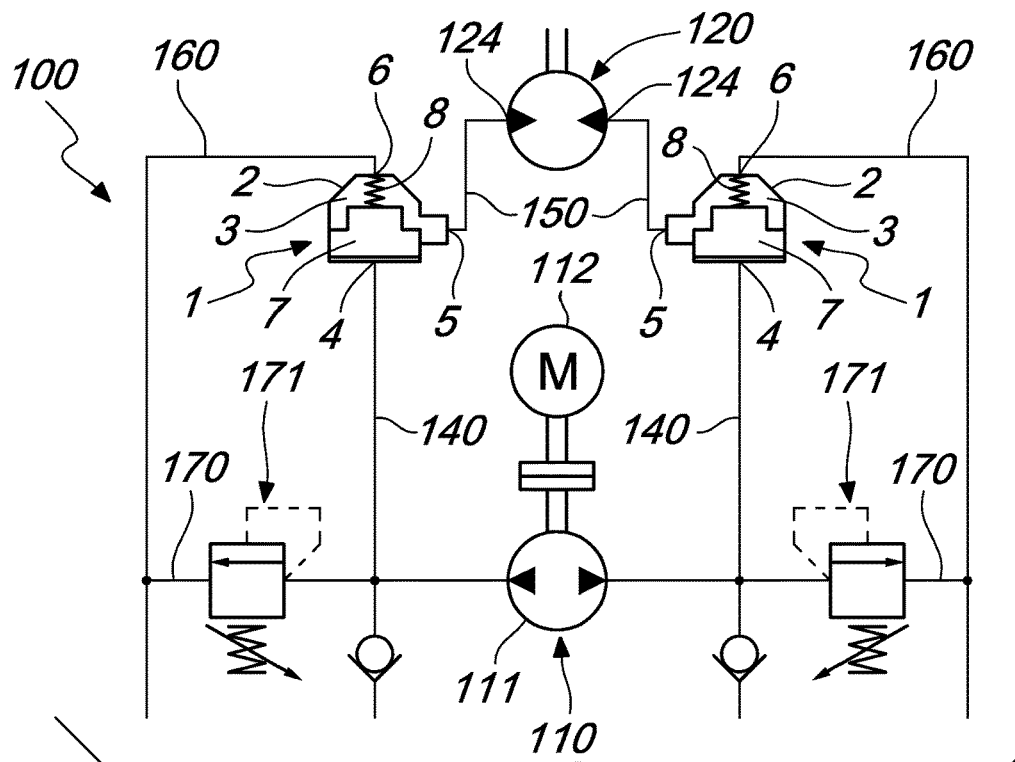
FIG. 26 is a schematic representation of a management circuit of a double acting rotary actuator that employs two logic valves according to the first embodiment of the invention.

FIG. 26 schematically illustrates a circuit 100 of the type described above in which the actuator 120 is of double acting rotary type and two valves 1 according to the first embodiment above are provided.

Figure 27:
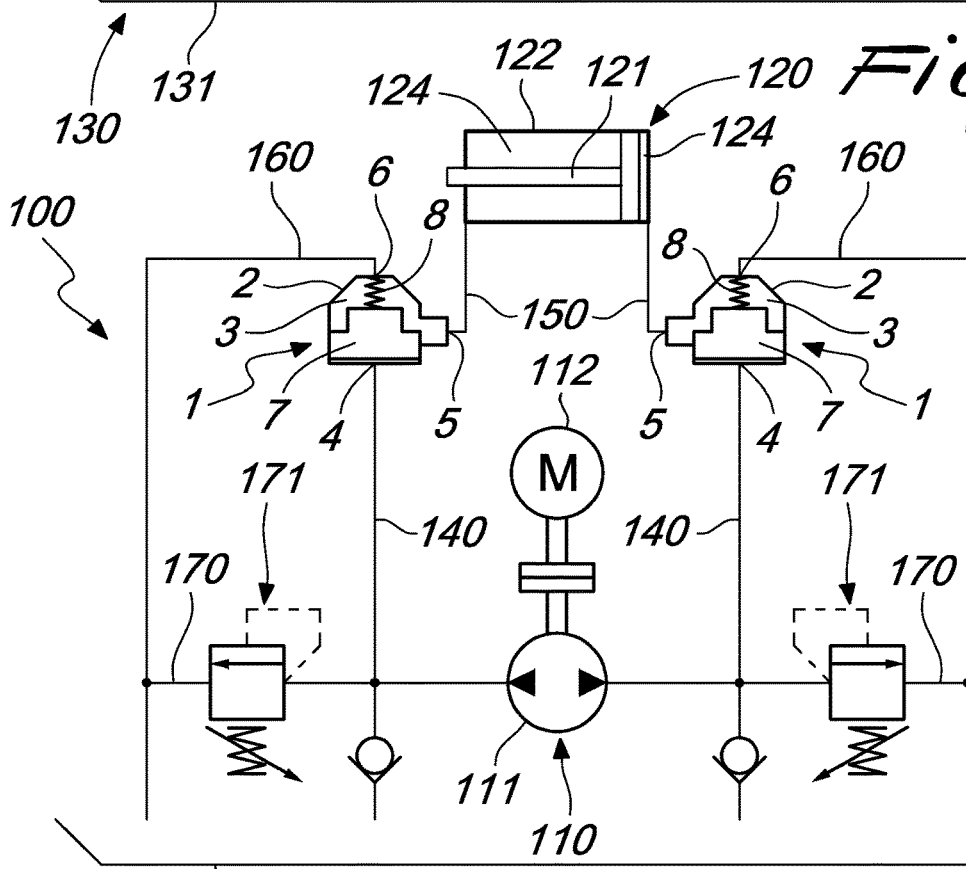
FIG. 27 is a schematic representation of a management circuit of a double acting linear actuator that employs two logic valves according to the first embodiment of the invention.

FIG. 27 schematically illustrates a variant of the circuit 100 of FIG. 26 in which the actuator 120 is of double acting linear type.

Figure 28:
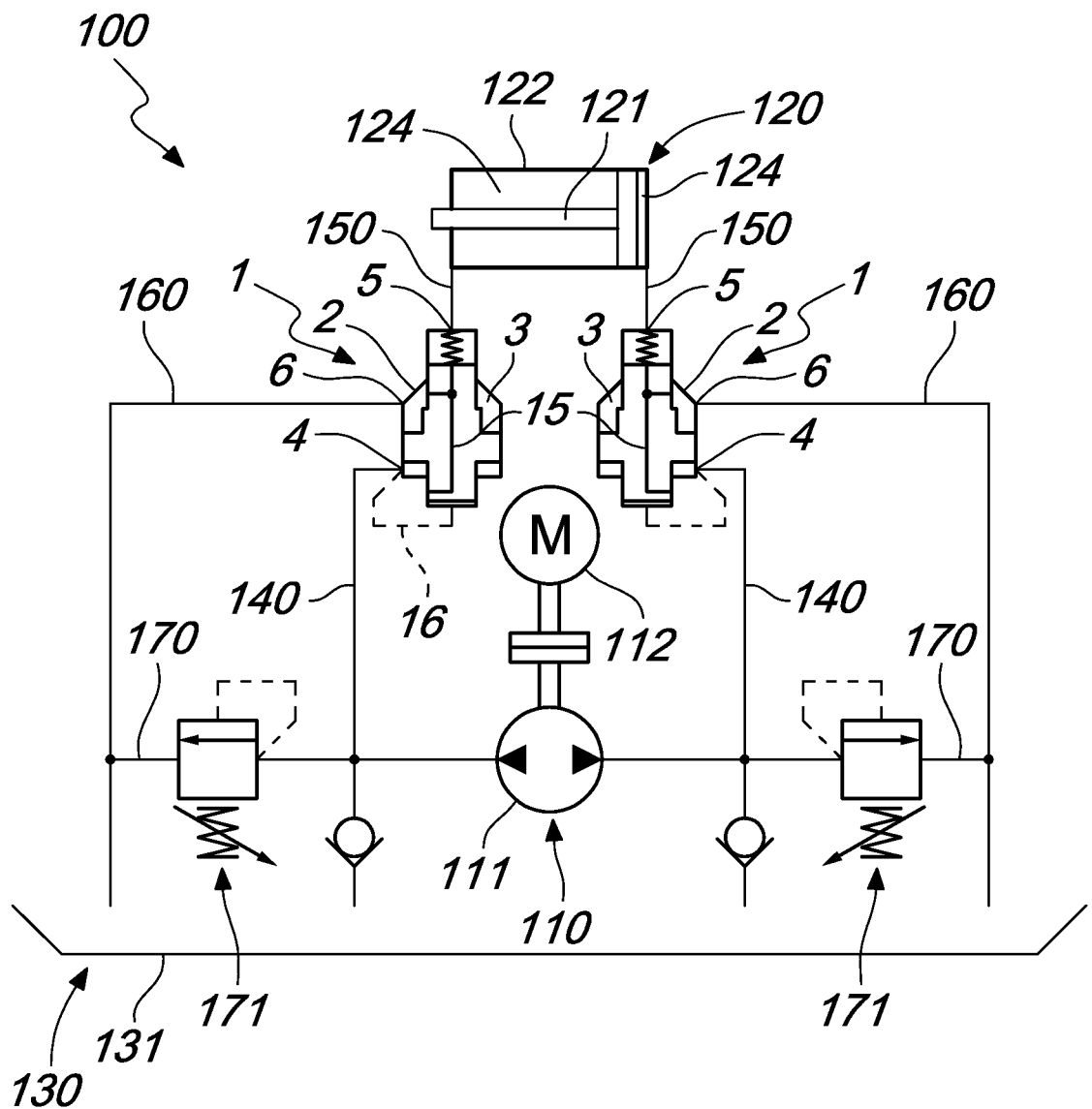
FIG. 28 is a schematic representation of a management circuit of a double acting linear actuator that employs two logic valves according to the second embodiment of the invention.

FIG. 28 schematically illustrates a variant of the circuit 100 of FIG. 27 that employs two valves 1 according to the second embodiment described above.

In practice, it has been seen how the invention described achieves the objects set and in particular the fact that the logic valve according to the invention has a simple structure, reduced manufacturing costs and high reliability in use is underscored. Moreover, the valve according to the invention is flexible in use and does not require particular structural modifications to hydraulic actuators.

The invention thus conceived is susceptible to numerous modifications and variants, all falling within the scope of the inventive concept.

Moreover, all parts can be replaced by other technically equivalent elements.

In practice, the materials used, as well as the shapes and contingent dimensions, may be any of those according to the requirements, without abandoning the protective scope of the claims which follow.

FIGS. 1-28 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 6-10, and 16-22 are drawn approximate to scale, although other relative dimensions may be used, if desired.

In a first aspect, a logic valve for managing a first hydraulic actuator comprising:

a valve body internally equipped with a hollow seat developing along a working direction and communicating with a first port suitable for being put in communication of fluid with a supplying element of a working fluid under pressure, a second port adapted to be put in fluid communication with an operating chamber of a second hydraulic actuator, a third port adapted to be put in fluid communication with a drain configured to discharge the working fluid;

a slider housed inside said hollow seat movable along the working direction; and a spring interposed between the valve body and the slider and acting on the slider itself along said working direction in the direction of removal from the third port; wherein the slider is alternatively movable between a first operating configuration for fluidly coupling the second and third ports and sealing them from the first port and a second operating configuration for fluidly coupling the first and second ports and sealing them from the third port.

The valve of the first aspect, wherein the slider is configured to assume a transitory position between the first and second operating configurations in which said first, second and third port are isolated from each other.

In the valve of the first aspect, the first and third ports are in fluid communication with the hollow seat at the opposite ends along said working direction and that the second port is in fluid communication with the hollow seat in an intermediate position between the previous ones.

In the valve of the first aspect, the slider comprises a first active surface comprising a circular shape facing the first port, a third active surface comprising a circular shape facing the third port and a second active surface comprising an annular conformation interposed between the first and third active surfaces and facing the second and third ports, a sum of extensions of the second and of the third active surfaces being substantially equal to an extension of the first surface, in the first operative configuration the second active surface is arranged between the first and the second ports along the direction of work and in the second operating configuration the second active surface is arranged between the second and third ports along the working direction itself.

In the valve of the first aspect, the first port is in fluid communication with the hollow seat near and at a first end along the working direction, the second port is in fluid communication with a second end, opposite the first, of the hollow seat along the working direction and the third port is in communication of fluid with the hollow seat in an intermediate position between the first end and the second end, the slider is equipped with at least an internal channel passing through to communicate the first and second ports in a second configuration operative and of the second and third ports in a first operative configuration.

In the valve of the first aspect, the slider comprises a first circular surface and a first annular surface facing the first port, a second circular surface facing the second port and a third annular surface facing the third port, the first circular surface and the second circular surface having extensions substantially equal to each other and the first annular surface and the third annular surface having extensions substantially equal to each other.

In the valve of the first aspect, a maximum pressure is associated with the first port.

In a second aspect, a hydraulic management circuit comprises:

a hydraulic actuator having at least one operating chamber;

a supply element configured to supply a pressurized working fluid; and a drain configured to discharge a working fluid; wherein the hydraulic management circuit further comprises at least one logic valve comprising a first port in fluid communication with a first operating line fluidly coupled to the supply element, a second port in fluid communication with a second operative line fluidly coupled to the at least one operative chamber, and a third port in fluid communication with a third operative line fluidly coupled to the drain.

The hydraulic management circuit of the second aspect, wherein the hydraulic actuator is of double-acting type and comprises two of the at least one operating chamber and which comprises two of the at least one logic valve, each of which comprise the first port in fluid communication with the supply element through respective first operating lines, the second port in fluid communication with respective operating chambers via corresponding second operating lines, and the third port in fluid communication with the drain via corresponding third operating lines.

In the valve of the second aspect the hydraulic actuator is of the linear type.

In the valve of the second aspect the hydraulic actuator is of the rotary type.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A logic valve for management of a hydraulic actuator comprising:

a valve body provided internally with a hollow seat which is extended along a work direction and communicates with a first port adapted to be placed in fluid communication with a pressurized working fluid, a second port adapted to be placed in fluid communication with an operating chamber of the hydraulic actuator, and a third port adapted for discharging the working fluid;

a slider accommodated within said hollow seat which can move with an alternating sliding motion along said work direction; and a spring interposed between said valve body and said slider and oriented to act on said slider along said work direction in a direction away from said third port, wherein said slider can move alternately between a first operating configuration fluidly coupling said second and third ports and excluding fluid communication between them and said first port, and a second operating configuration fluidly coupling said first and second ports and excluding fluid communication between them and said third port, and wherein said slider has a first circular active surface which faces said first port, a third circular active surface which faces said third port, and a second annular active surface which is interposed between the first and third active surfaces and faces said second or third port, the sum of the extensions of the second and third surfaces being substantially equal to the extension of the first surface, in the first operating configuration the second surface being arranged between the first and second ports along the work direction, and in the second operating configuration the second surface being arranged between the second and third ports along said work direction.

2. The valve according to claim 1, wherein in a transition between said first and second operating configurations said slider is adapted to assume a transient configuration in which said first, second and third ports are mutually isolated.

3. The valve according to claim 1, wherein said first and third ports are in fluid communication with said hollow seat at mutually opposite ends along said work direction and said second port is in fluid communication with said hollow seat in a position that is intermediate between the first and third ports.

4. The valve according to claim 1, wherein said slider has a continuous external surface adapted so as not to be crossed by the working fluid.

5. The valve according to claim 1, wherein said first port is in fluid communication with said hollow seat proximate to and at a first end along said work direction, said second port is in fluid communication with a second end of said hollow seat along said work direction arranged opposite the first end, and said third port is in fluid communication with said hollow seat in a position that is intermediate between the first end and the second end, the slider being provided with at least one internal through channel for establishing communication of the first and second ports in the second operating configuration and of the second and third ports in the first operating configuration.

6. The valve according to claim 5, wherein the first circular surface and the second circular surface having substantially mutually identical extensions, and the first annular surface and the third annular surface having substantially mutually identical extensions.

7. The valve according to claim 1, wherein it comprises a maximum pressure valve assembly associated with said first port.

8. A hydraulic management circuit, comprising:
a hydraulic actuator which has at least one operating chamber;
a supply element configured to supply a pressurized working fluid;
a drain configured to discharge said working fluid; and
at least one logic valve according to claim 1, having said first port in fluid communication with a first operating line for connection with said supply element, said second port in fluid communication with a second operating line for connection with said operating chamber, and said third port in fluid communication with a third operating line for connection with said drain.

9. The circuit according to claim 8, wherein said hydraulic actuator is of the double-acting type and comprises two of said operating chambers and two of said logic valves, each of which has the first port in fluid communication with said supply element by means of a respective first operating line for connection, the second port in fluid communication with a respective operating chamber by means of a corresponding second operating line for connection, and the third port in fluid communication with said drain by means of a respective third operating line for connection.

10. The circuit according to claim 8, wherein said hydraulic actuator is of the linear type.

11. The circuit according to claim 8, wherein said actuator is of the rotary type.

12. The circuit according to claim 9, wherein said hydraulic actuator is of the linear type.

13. The circuit according to claim 9, wherein said actuator is of the rotary type.

14. The valve according to claim 2, wherein said first and third ports are in fluid communication with said hollow seat at mutually opposite ends along said work direction and said second port is in fluid communication with said hollow seat in a position that is intermediate between the first and third ports.

15. The valve according to claim 2, wherein said first port is in fluid communication with said hollow seat proximate to and at a first end along said work direction, said second port is in fluid communication with a second end of said hollow seat along said work direction arranged opposite the first end, and said third port is in fluid communication with said hollow seat in a position that is intermediate between the first end and the second end, the slider being provided with at least one internal through channel for establishing communication of the first and second ports in the second operating configuration and of the second and third ports in the first operating configuration.

16. The valve according to claim 3, wherein said slider has a continuous external surface adapted so as not to be crossed by the working fluid.

17. The valve according to claim 2, wherein said slider has a continuous external surface adapted so as not to be crossed by the working fluid.

18. The valve according to claim 4, wherein said slider has a first circular active surface which faces said first port, a third circular active surface which faces said third port, and a second annular active surface which is interposed between the first and third active surfaces and faces said second and/or third port, the sum of the extensions of the second and third surfaces being substantially equal to the extension of the first surface, in the first operating configuration the second surface being arranged between the first and second ports along the work direction, and in the second operating configuration the second surface being arranged between the second and third ports along said work direction.

19. The valve according to claim 3, wherein said slider has a first circular active surface which faces said first port, a third circular active surface which faces said third port, and a second annular active surface which is interposed between the first and third active surfaces and faces said second and/or third port, the sum of the extensions of the second and third surfaces being substantially equal to the extension of the first surface, in the first operating configuration the second surface being arranged between the first and second ports along the work direction, and in the second operating configuration the second surface being arranged between the second and third ports along said work direction.

* * * * *